(12) United States Patent
Givargis

(10) Patent No.: US 10,558,567 B1
(45) Date of Patent: Feb. 11, 2020

(54) STORAGE DEVICE EMBEDDED STRAND ARCHITECTURE

(71) Applicant: Levyx, Inc., Irvine, CA (US)

(72) Inventor: Tony Givargis, Irvine, CA (US)

(73) Assignee: Levyx, Inc., Irvine, CA (US)

(*) Notice: Subject to any disclaimer, the term of this patent is extended or adjusted under 35 U.S.C. 154(b) by 0 days.

(21) Appl. No.: 15/962,660

(22) Filed: Apr. 25, 2018

Related U.S. Application Data

(60) Provisional application No. 62/505,790, filed on May 12, 2017.

(51) Int. Cl.
 *G06F 12/12* (2016.01)
 *G06F 12/02* (2006.01)
 *G06F 3/06* (2006.01)

(52) U.S. Cl.
 CPC ........ *G06F 12/0276* (2013.01); *G06F 3/0604* (2013.01); *G06F 3/0631* (2013.01); *G06F 3/0652* (2013.01); *G06F 3/0659* (2013.01); *G06F 3/0679* (2013.01); *G06F 12/0246* (2013.01); *G06F 2212/7205* (2013.01)

(58) Field of Classification Search
 CPC .......................... G06F 12/0276; G06F 3/0652
 USPC .......................................................... 711/103
 See application file for complete search history.

(56) References Cited

U.S. PATENT DOCUMENTS

| | | | |
|---|---|---|---|
| 8,131,696 B2 | 3/2012 | Chandrasekaran | |
| 8,386,700 B2 | 2/2013 | Olbrich et al. | |
| 9,342,260 B2 | 5/2016 | Schuette et al. | |
| 9,460,008 B1 | 10/2016 | Leshinsky et al. | |
| 2003/0051114 A1* | 3/2003 | Natu | G06F 8/60 711/165 |
| 2003/0191916 A1* | 10/2003 | McBrearty | G06F 11/1464 711/162 |
| 2011/0113075 A1 | 5/2011 | Fukushima | |
| 2017/0123972 A1 | 5/2017 | Gopinath et al. | |
| 2017/0153973 A1 | 6/2017 | Schatzl et al. | |

FOREIGN PATENT DOCUMENTS

EP  2 315 126 A1  2/2010

* cited by examiner

*Primary Examiner* — Jae U Yu
(74) *Attorney, Agent, or Firm* — Fish IP Law, LLP

(57) ABSTRACT

A system for optimizing the use of append-only strand data structures is disclosed, with a device driver that transmits strand commands to firmware on a storage device. The storage device firmware executes strand commands natively on the storage device without needing to transmit data over the system bus to copy data to/from a strand saved on the storage device.

11 Claims, 2 Drawing Sheets

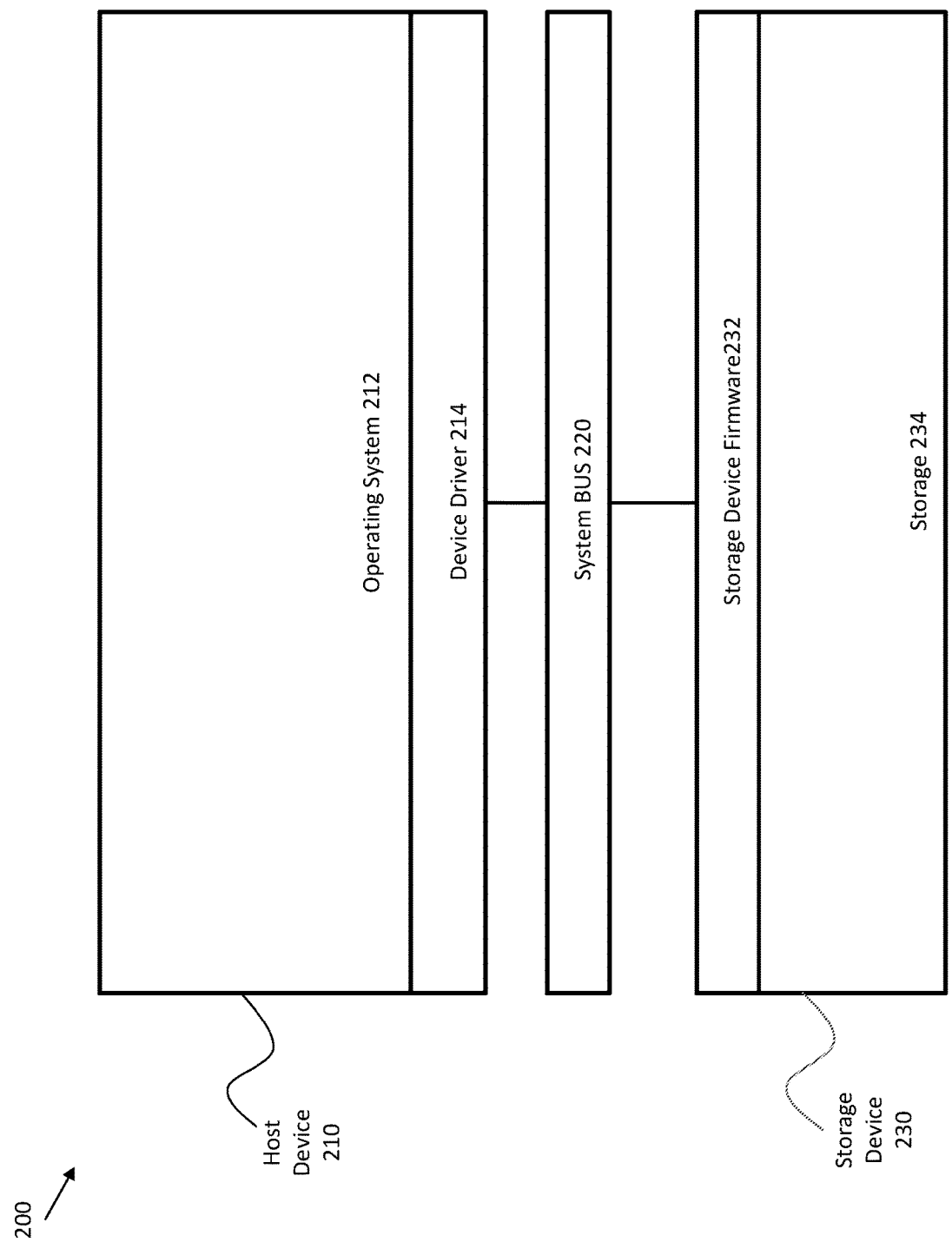

STORAGE DEVICE EMBEDDED STRAND ARCHITECTURE

FIELD OF THE INVENTION

The field of the invention is storage devices.

BACKGROUND OF THE INVENTION

Garbage collection for storage devices can be resource-intensive, particularly for systems big-data systems that move gigabytes and even terabytes of data daily. Optimization of garbage-collection methods can free resources to perform more complex computing tasks. EP 2315126 to Fukushima teaches a garbage collection program that uses an append-only file system in flash memory that aims to reduce the number of writing times to a main memory. Fukushima appends data to the flash memory, but only copies necessary data from the flash memory to the main memory, and then deletes the entirety of the flash memory. Constantly deleting and wiping the flash memory for each garbage collection process, however, takes time. In addition, transfer of data from a flash memory to the main memory, requires data to be transferred via the main memory bus multiple times, once from the processor to the flash memory and another time from the flash memory to the main memory.

U.S. Pat. No. 9,342,260 to Schuette teaches methods for rapidly writing data to NAND flash media by virtualizing all of the address blocks on the media. Data blocks on the memory are virtualized and placed in an over-provisioning pool that always contains un-used blocks. Writes to Schuette's system are sent to an append-only memory space, such that blocks are dynamically assigned to either a user accessible pool or a pool of spare blocks, and user-accessible blocks are cycled into the user memory. Schuette's system, however, requires a great deal of resources to keep track of the virtualized blocks and switching, which can only be performed by the main computer processor, requiring multiple virtualization handshaking commands to be transmitted between the main computer processor and the NAND memory to maintain Schuette's different block pools.

Therefore, there is a need for improved garbage collection systems and methods to minimize total use of system resources.

SUMMARY OF THE INVENTION

The following description includes information that may be useful in understanding the present invention. It is not an admission that any of the information provided herein is prior art or relevant to the presently claimed invention, or that any publication specifically or implicitly referenced is prior art.

The inventive subject matter provides apparatus, systems, and methods to optimize creation and maintenance of append-only strand data structures by utilizing a device driver to natively transmit strand commands to firmware of a storage device such that the storage device firmware natively maintains the append-only strand data structures on the storage device itself.

As used herein, a "strand" comprises a physical data structure on a storage device that only allows append-only tasks. Contemplated storage devices include Flash memory devices, SSD (solid state drive) memory devices, or any suitable NVM (non-volatile memory) devices. Preferably, firmware for the storage device generates each strand on the storage device as a physical contiguous memory space of a set size, for example 100 data blocks, 1000 data blocks or 1024 data blocks. In some embodiments, the firmware for the storage device could be programmed to generate strands having data blocks of different sizes, such as a first strand having data blocks of a first size and a second strand having data blocks of a second size, where the first size differs from the second size.

A device driver installed on the processor of the computer is programmed to transmit strand commands to the firmware of the storage device, which natively generates, maintains, and deletes append-only strand data structures on the computer-readable medium in response to the strand commands from the device driver. As used herein, a "strand command" comprises a command that either uniquely identifies a strand of the storage device, or a command that returns an identifier for a uniquely identified strand, and instructs the firmware to interact with the uniquely identified strand in some manner, for example by generating a strand (which returns a unique identifier for the generated strand), writing data to the strand, "overwriting" data in the strand, "deleting" data in the strand, or flushing a portion of the strand to a memory location. Since strands are append-only data structures, deleting data merely means that a sentinel "delete marker" is appended to the end of the strand, invalidating the earlier data, and overwriting data merely means that a sentinel "overwrite marker" is appended to the end of the strand, invalidating the earlier data in the strand.

In this manner, the device driver is capable of maintaining strands on the computer-readable medium without needing to repeatedly copy data between the storage device and the operating system processor in order to maintain a strand.

Various objects, features, aspects and advantages of the inventive subject matter will become more apparent from the following detailed description of preferred embodiments, along with the accompanying drawing figures in which like numerals represent like components. For example, the system could derive an optimal write block size for the data managed by a command index, or portion of the command index, as a function of the high level parameters and/or low level parameters. Such systems could optimize the number of bulk reads on a storage media or optimize the number of bulk sequence writes on the storage media.

The following discussion provides many example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

BRIEF DESCRIPTION OF THE DRAWING

FIG. 2 shows a hardware schematic of an exemplary computer system having a firmware that natively maintains data strands on the computer-readable medium.

DETAILED DESCRIPTION OF THE INVENTION

Figure 1:
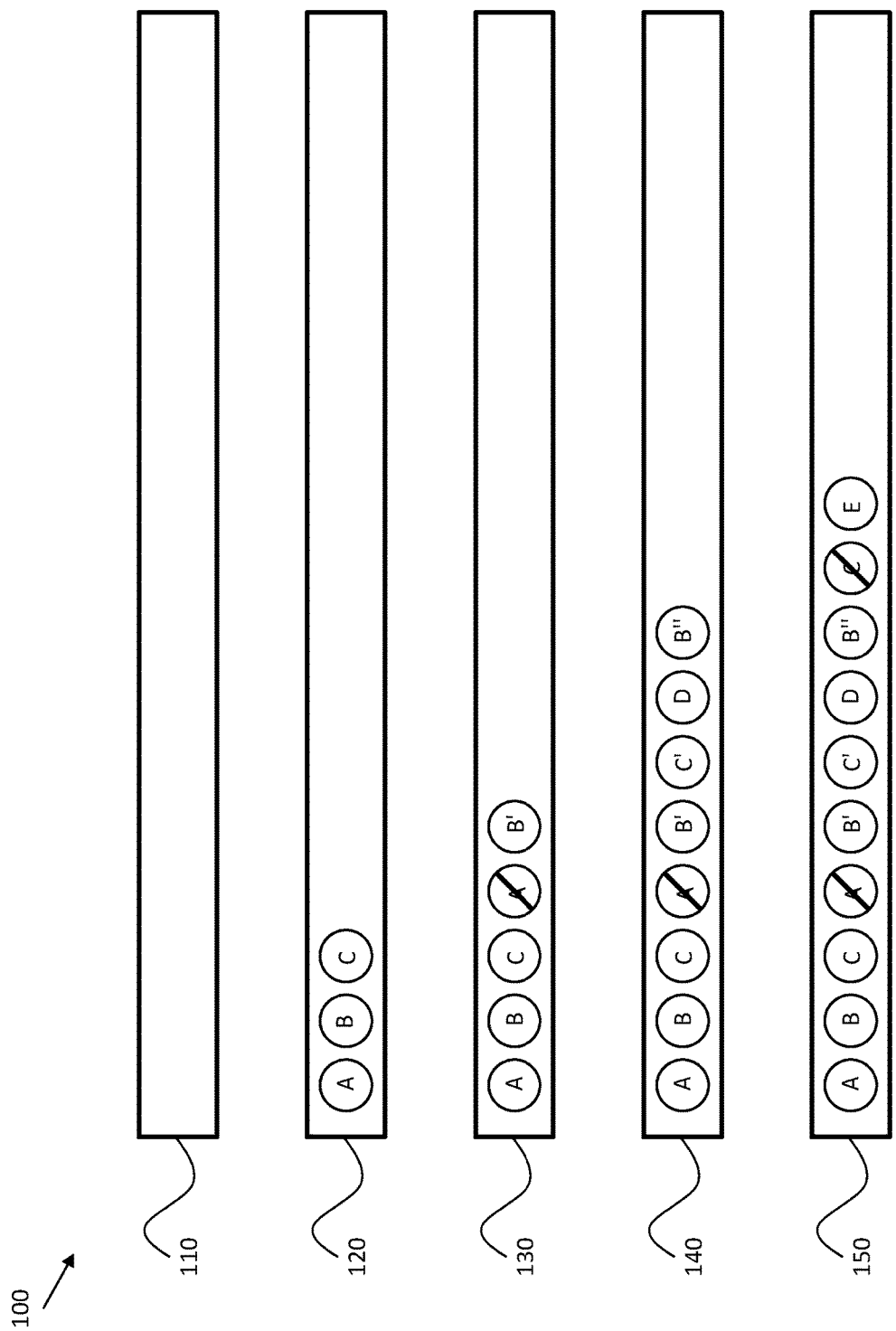
FIG. 1 shows a logical schematic of append-only strand data structures on the computer-readable medium

The following description includes information that may be useful in understanding the present invention. It is not an admission that any of the information provided herein is prior art or relevant to the presently claimed invention, or that any publication specifically or implicitly referenced is prior art.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. An electronic device that is "functionally coupled" or "communicatively coupled" to another computer system is one that is built to transmit and/or receive data from one computer system to another. Data could be transmitted in compressed or uncompressed form.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be noted that any language directed to a computer system should be read to include any suitable combination of computing devices, including servers, interfaces, systems, databases, agents, peers, engines, controllers, or other types of computing devices operating individually or collectively. One should appreciate that computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network. Computer software that is "programmed" with instructions is developed, compiled, and saved to a computer-readable non-transitory medium specifically to accomplish the tasks and functions set forth by the disclosure when executed by a computer processor.

The inventive subject matter provides apparatus, systems, and methods in which an operating system and a storage device are structured to ensure that the storage device firmware executes strand functions.

As used herein, a "strand" comprises a physical data structure on a storage device that only allows append-only tasks. An example of a strand 100 is shown in FIG. 1. At state 110, the strand is newly created of a finite capacity. While strands preferably have a static total capacity, in some embodiments, a strand may be a variable capacity strand, which grows and shrinks as needed—either in response to grow/shrink commands from a device driver or in response to dynamic firmware-generated instructions. Preferably, the strand is similar to an allocated data block on a physical data structure—a contiguous set of allocated memory of a certain size. Strand 110 shown here is allocated to hold only seventeen objects of the same size, although strands could be allocated to hold more or less objects, or objects of variable size. In embodiments with objects of the same size, each object may be referred to as a separate data block for the strand. Strand 120 has received three objects A, B, and C. Strand 130 has received an object that deletes object A, and an object that overwrites object B with data B'. Strand 140 has received an object that overwrites object C with data C', adds object D, and overwrites B' with data B". Strand 150 has received an object that deletes object C, and that adds object E.

After receiving the many objects, strand 150 contains a great deal of irrelevant garbage data—namely deleted objects A and C, and overwritten objects B, B', and C. However, strand data structures with append-only functionality are quite rapid, particularly when implemented by storage device firmware. When the computer system receives a command to flush strand 150 to memory (not shown), the computer device only writes data objects B", D, and E to the memory, as the other data objects of strand 150 have been overwritten or deleted.

FIG. 2 shows an exemplary computer infrastructure 200 having host device 210 coupled to storage device 230 via system BUS 220. Host device 210 comprises an operating system 212 that communicates to storage device 230 via device driver 214. Storage device 230 receives commands, such as generate block, read block, write block, generate strand, open strand, close strand, append to strand, etc., via storage device firmware 232, which acts as a gateway to the physical storage 234. Storage device firmware 232 is physically embedded on storage device 230, such as an SSD processor, whereas device driver 214 is physically instantiated on the hard drive of the computer system's operating system 212. Preferably, storage device firmware 232 provides access to strand functions via an API that device driver 214 sends commands to.

When device driver 214 wishes to write data to a strand, instead of allocating a strand itself on local memory, such as RAM, device driver 214 transmits a command to create a new strand of a given size, or to open an existing strand, to storage device firmware 232, which preferably allocates a contiguous block of memory of a requested strand size (or a default strand size when a strand size is not provided by the generate strand command). When device driver 214 writes data to storage device 230, device driver 214 transmits a command to append an object to a given strand to storage device firmware 232, which then appends the object to the strand—preferably atomically such that two parallel requests do not interleave. While data is saved in the strand and has yet to be flushed, device driver 214 could seek information from a strand by sending a command to read data at a given offset (e.g. read data from memory strand #403 at memory offset 1130) or to read a given object (e.g. read object #5 from memory strand #403) within a strand.

Device driver 214 could also transmit commands to storage device firmware 232 to discard a strand, causing data on the strand to be lost forever, or to flush a strand to another memory location, either on storage 234 or on another storage coupled to system BUS 220 or on another system (not shown) coupled to system bus 220 via a network connection, which writes the strand's data (without garbage) to another memory location, such as persistent storage on one or more other memories coupled to the storage device firmware via system bus 220.

In some embodiments, storage device 230 makes use of an intermediate buffer (e.g. DRAM) for storing strands in order to increase performance returns rather than directly reading and writing the strands to a slower persistent storage fabric (e.g. flash). In such embodiments, the firmware may receive a flush command from device driver 214, which is an advisory call to storage device 230 to request that any buffered strands saved on the intermediate buffer to permanent memory in storage 234 to be written permanently to the persistent storage from the intermediate buffer. In such embodiments, the flushed strand could then be deleted or could be registered as an empty strand (e.g. by zeroing out a bit in the strand's header).

Storage device firmware 232 could also copy a first strand's data to a second strand, for example when the first strand has run out of space and needs to be written to a second strand having more space, or could copy data from multiple strands into a single strand. Storage device firmware 232 could be configured to close a strand, which ends a session and frees a handle while retaining the data in the strand in storage device 230, and could be programmed to re-open that handle at a later data when receiving an open strand command from device driver 214.

By implementing lower-level strand functions on storage device firmware 232, execution of those lower-level strand functions can occur at a much more rapid pace than if those strand functions were executed on host device 210. Devices that natively support strands (i.e., a collection of objects that are stored in an append-only fashion) provide the advantage of eliminating unnecessary transmission of data between the device and the host. For example, a single short command issued to the storage device 230 by the host device 210 to copy content from one strand (holding 10 GB of data) to another strand would otherwise (in a system not benefiting from this invention) require the transfer of the entire dataset (i.e., 10 GB) across the system bus 220 twice (once to read from the source strand and once to write to the destination strand). Typically the system bus 220 will have much lower bandwidth than the internal data path within storage device 230. Another advantage of this invention is that writes to the storage device 230 will always be in the form of an append operation. In other words, the storage device would not need to accommodate read-modify-write functionality. Many storage fabrics (e.g., flash) have asymmetric read/write characteristics, making read-modify-write or re-write operations more expensive in terms of time and power consumption. Implementing append-only strand functionality at the firmware level on storage device 230, thus, minimizes use of system BUS 220 by allowing data to only be transmitted to storage device 230 once for write operations while using the benefits of rapid functionality of strand data structures.

In some embodiments, device driver 214 need only send read/write/delete/search commands to storage device firmware 232, eliminating the need to send strand commands to storage device firmware 232 entirely. In such embodiments, storage device 230 requires a more powerful processor able to generate, maintain, and delete strands similarly to the way device driver 214 generates, maintains, and deletes strand, keeping the entire strand architecture as a black box unknown and inaccessible to device driver 214. Storage device firmware 232 would then need to have the processing power to decide when to open strands, flush strands, and perform garbage collection tasks, for example by performing garbage collection on a strand when no data commands are queued, and pausing garbage collection when a new command is received from device driver 214. In preferred embodiments, such smart storage device firmware 232 is configured to generate a plurality of strands, and automatically flush strands when either a strand is full or when a threshold period of time (e.g. 1 second, 5 seconds) has passed without a read/write/delete/search command being sent to storage device firmware 232.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A system for maintaining append-only strand data structures, comprising:
    a storage device comprising a firmware and a computer-readable medium;
    wherein the computer-readable medium comprises a volatile memory and a non-volatile memory; and
    a host device comprising an operating system and a device driver,
        wherein the operating system is programmed to access data on the storage device via the device driver,
        wherein the device driver is programmed to transmit strand commands to the firmware of the storage device,
        wherein the firmware is further programmed to natively copy contents of a first append-only strand from the volatile memory to the non-volatile memory in response to a flush strand command from the device driver; and wherein natively copying the contents of the first append-only strand comprises performing garbage-collection on the first append-only strand prior to copying the contents of the first append-only strand to the non-volatile memory.

2. The system of claim 1, wherein the firmware is further programmed to format the computer-readable medium in response to a strand command from the device driver, wherein the formatting step discards all existing strands on the computer-readable medium.

3. The system of claim 1, wherein the firmware is further programmed to generate a first append-only strand on the computer-readable medium by natively allocating a logically contiguous memory space on the computer-readable medium in response to a new strand command from the device driver.

4. The system of claim 3, wherein the firmware is further programmed to natively append an object to the first append-only strand in response to an append object command from the device driver.

5. The system of claim 3, wherein the firmware is further programmed to natively close the first append-only strand in response to a close strand command from the device driver.

6. The system of claim 5, wherein the firmware is further programmed to natively open the first append-only strand in response to an open strand command from the device driver.

7. The system of claim 3, wherein the firmware is further programmed to natively deallocate the first append-only strand in response to a discard strand command from the device driver.

8. The system of claim 1, wherein natively copying the contents of the first append-only strand comprises only copying non-overwritten and non-deleted objects from the first append-only strand to the non-volatile memory.

9. The system of claim 3, wherein the firmware is further programmed to transmit data to the device driver from the first append-only strand at an offset from a starting point of the append-only strand in response to a read from offset command from the device driver.

10. The system of claim 3, wherein the firmware is further programmed to transmit an object to the device driver from the first append-only strand in response to a read an object command from the device driver.

11. The system of claim 3, wherein the firmware is further programmed to natively copy the contents from the first append-only strand to a second append-only strand in response to a copy command from the device driver.

\* \* \* \* \*